United States Patent [19]

Holmes

[11] Patent Number: 5,214,324

[45] Date of Patent: May 25, 1993

[54] STATOR AIR BAFFLE

[75] Inventor: Carl A. Holmes, Erie, Pa.

[73] Assignee: General Electric Company, Erie, Pa.

[21] Appl. No.: 817,269

[22] Filed: Jan. 3, 1992

[51] Int. Cl.$^5$ .................. H02K 9/00; H02K 9/02; H02K 3/46

[52] U.S. Cl. .................................. 310/52; 310/58; 310/260

[58] Field of Search .............. 310/52, 53, 58, 59, 310/60 R, 260, 270, 43, 45

[56] References Cited

U.S. PATENT DOCUMENTS

| | | | |
|---|---|---|---|
| 3,691,416 | 9/1972 | Drexler et al. | 310/260 |
| 3,819,965 | 6/1974 | Schoendube | 310/58 |
| 4,442,371 | 4/1984 | Utsunomiya et al. | 310/260 |
| 4,766,337 | 8/1988 | Parkinson et al. | 310/58 |
| 5,057,730 | 10/1991 | Yoshida | 310/91 |

FOREIGN PATENT DOCUMENTS

| | | | |
|---|---|---|---|
| 0150755 | 11/1980 | Japan | 310/58 |
| 0097251 | 4/1990 | Japan | 310/58 |
| 0381132 | 7/1973 | U.S.S.R. | 310/260 |

Primary Examiner—Emanuel T. Voeltz
Assistant Examiner—C. LaBalle
Attorney, Agent, or Firm—R. Thomas Payne

[57] ABSTRACT

An air baffle is provided to redirect cooling air flow for the stator of an electric motor. The air baffle is provided at the air outlet end of the motor, and extends between the stator frame and the stator coils, so that air is forced to pass through the coils to exit the motor. The baffle is fixed to the coils, but is loosely mounted to the stator frame in a floating manner so that the entire assembly is free to rotate and can have limited longitudinal motion when necessary according to the operating condition of the motor.

20 Claims, 2 Drawing Sheets

STATOR AIR BAFFLE

BACKGROUND OF THE INVENTION

1. Field of the Invention

The present invention relates to structures for directing the air flow in a dynamo electric machine such as an electric motor or an alternator, and in particular to structures for directing the air flow through the stator of a dynamoelectric machine.

2. Brief Description of the Related Art

As shown in FIG. 2, the stator 10 of a typical dynamo electric machine is formed by a series of coils 12 held in a solid body 14, e.g., a series of metal plates laminated together. The coils are held in position relative to one another by a tie ring 16.

The stator 10 is cooled by air blowing past the stator 10, through any available air channels in the stator 10 and through the gap between the stator 10 and the rotor 17, as shown generally by the arrows A. Only the ends 18 of the coils are directly exposed to the air flow, and while a chamfer 19 helps direct air towards the ends 18, very little of the air actually passes through the ends 18 due to the high flow resistance through the ends. Instead, most of the air flows around the outside surface of the coil ends.

SUMMARY OF THE INVENTION

It is the object of the present invention to improve the cooling efficiency of the air flow through a stator by providing a simple, effective structure to force more of the air flowing through the stator to actually pass through the coil ends.

This object is achieved by providing an annular air baffle adjacent to the air outlet end of the stator. The baffle extends from the stator frame to the coils and substantially seals the space between them. Air then can only pass through the stator by flowing through the stator coil ends themselves.

While the stator air baffle extends between and seals against both the frame and the coils, it cannot rigidly connect them. Under certain operating conditions, the coils may rotate and/or expand axially by a small amount. The stator baffle therefore must allow at least limited axial and rotary motion or flexing of the coils relative to the stator frame. However, even under these unusual operating conditions, it is preferable for the coils to be kept in alignment relative to one another so that the machine stays properly adjusted. It therefore is a further object of the present invention to provide a structure which helps to support the stator coils in their proper positions relative to one another, but still allows for the small axial and rotary movements the coils sometimes experience.

This is accomplished according to the present invention by tying the inner surface of the annular air baffle to the coils, but allowing the outer edge to float in an annular gap in the stator frame. The width of the annular gap allows for limited axial motion, but generally holds the baffle in a predetermined axial position. Meanwhile, the air baffle maintains the relative spacing between adjacent stator coils because they are tied to it, while allowing rotational movement of the entire assembly because the outer edge of the air baffle can slip rotationally within the annular gap in the stator frame. The air baffle is also radially flexible which allows for local deformation.

Preferably, the baffle is formed of fiberglass and an annular felt pad or a plurality of arcuate pad sections placed between the baffle and the coils. Glass ties then extend through the baffle and the felt pad to tie around the coils and hold the entire assembly together. Varnish can be applied to the entire assembly to rigidify and protect it.

The preferred structure and materials have the advantages of forming a good seal between the baffle and coils, and being able to withstand the high temperatures sometimes developed in the stator. This structure also has the advantage of being able to absorb significant levels of vibration, e.g., those which might be present in the machine when used in a diesel-electric locomotive.

Pieces of felt sometimes are placed between adjacent coil ends in a stator to help maintain the spacing between the coil ends. With past designs, it made relatively little difference exactly where the felt was placed along the exposed ends of the coils, since very little air flowed between the coil ends anyway. In contrast, according to the present invention, most of the air passes through the coil ends, so that the effect of the felt spacers on air flow can become significant.

According to a further aspect of the present invention, the felt spacers between the coil ends are staggered in a serpentine fashion so that the spacers on either side of a particular coil do not align with each other. By staggering the pieces of felt, at least one side of every portion of the coil end will be exposed to the air flow, further improving cooling and reducing the likelihood of high temperature hot spots.

In a further embodiment of the invention, a felt spacer may also be placed between the coil ends immediately adjacent to and pressed against the felt pad between the air baffle and the coils. Friction between the pads, plus the varnish applied as a final assembly step, then will help further rigidify the position of the coils relative to each other and the air baffle. At the same time, the outer edge of the baffle is still free to rotate and move axially within the annular gap in the stator frame, so that the necessary flexibility is still provided.

BRIEF DESCRIPTION OF THE DRAWINGS

The invention will be described in further detail with reference to the drawings, in which.

DETAILED DESCRIPTION OF THE PREFERRED EMBODIMENTS

Figure 1:
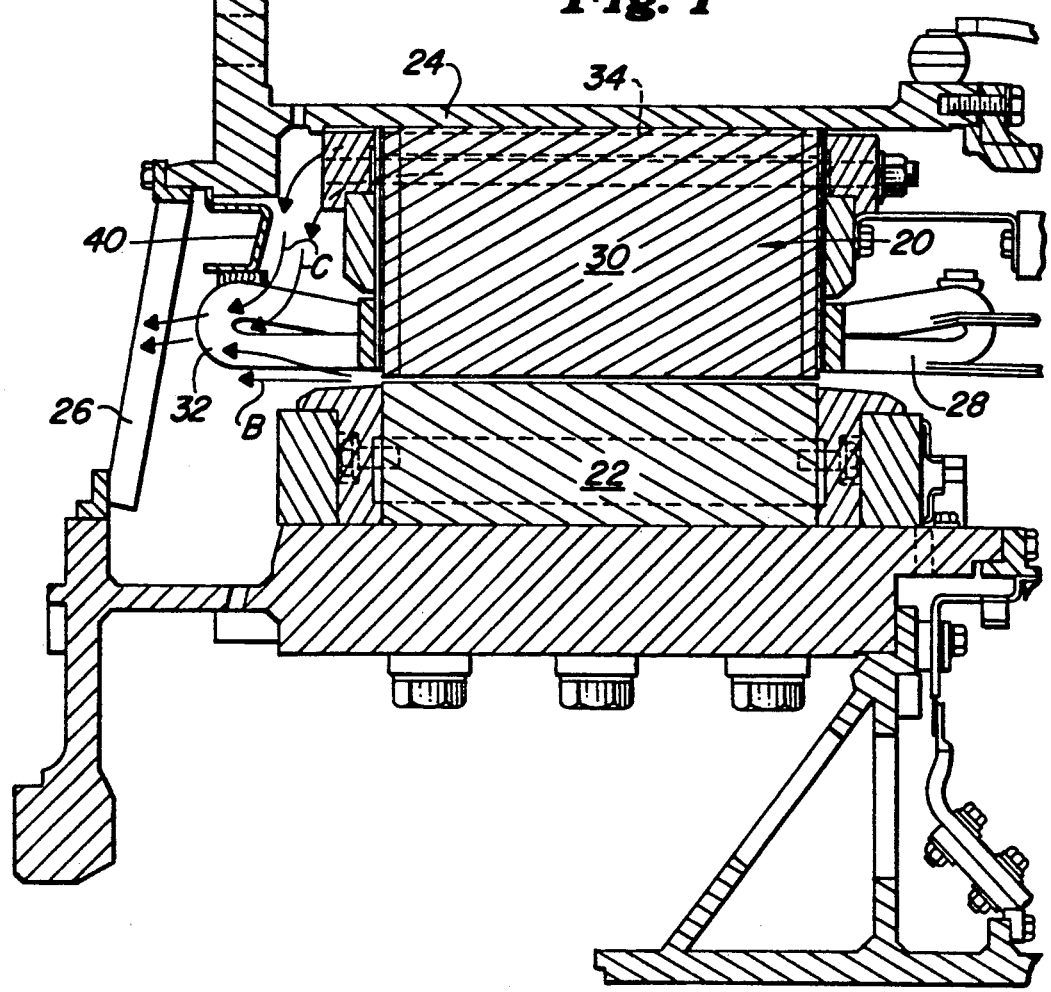
FIG. 1 is a cross sectional view of part of a dynamoelectric machine machine including an air baffle according to the present invention
Figure 2:
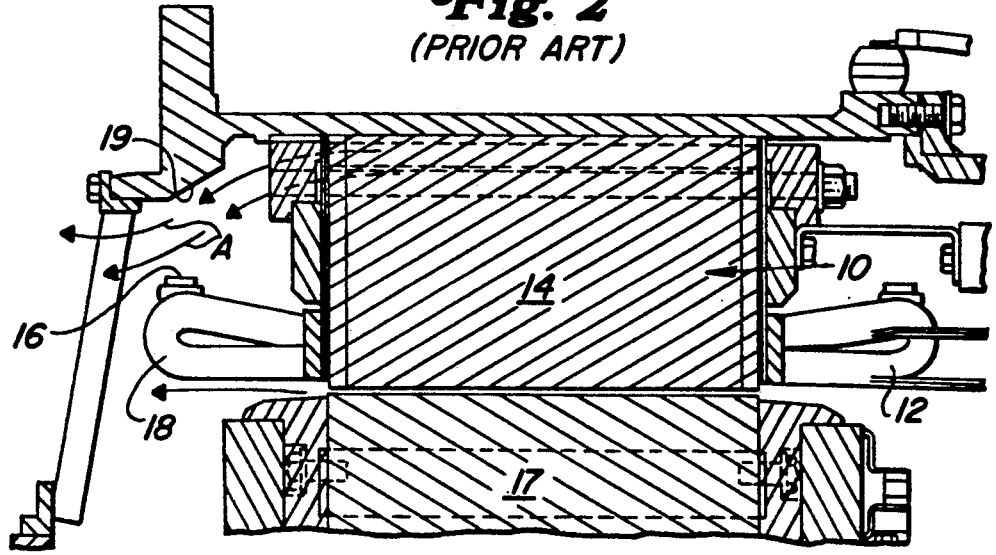
FIG. 2 is a cross sectional view similar to part of FIG. 1, but showing a structure according to the prior art.

FIG. 1 is a cross-sectional view of the upper part of a dynamoelectric machine having an air baffle according to the present invention. The machine includes a stator 20 and a rotor 22. The stator 20 is supported by a stator frame 24. A plurality of circumferentially spaced rotor supports 26 (only one of which is shown in the drawing) are mounted to the stator frame 24 to support the rotor 22 prior to being mounted for example to a diesel engine.

The stator 20 is formed by a plurality of circumferentially spaced coils 28 and a body 30, e.g., a series of metal plates laminated together. The main part of each coil 28 preferably is embedded inside the stator body 30 to be thermally connected thereto, with only the end portions 32 of each coil 28 exposed outside of the stator body 30. Preferably, the stator body 30 also is provided with a plurality of air passages 34 through which air can flow to cool the stator body 30 (and thereby cool the coils 28).

According to the present invention, an air baffle 40 is provided at the air outlet end of the stator 20. The air baffle 40 extends between the stator frame 24 and the end portions 32 of the coils 28, so that air flowing through the air passages 34 must also pass through the coil end portions 32 to exit the machine.

Figure 3:
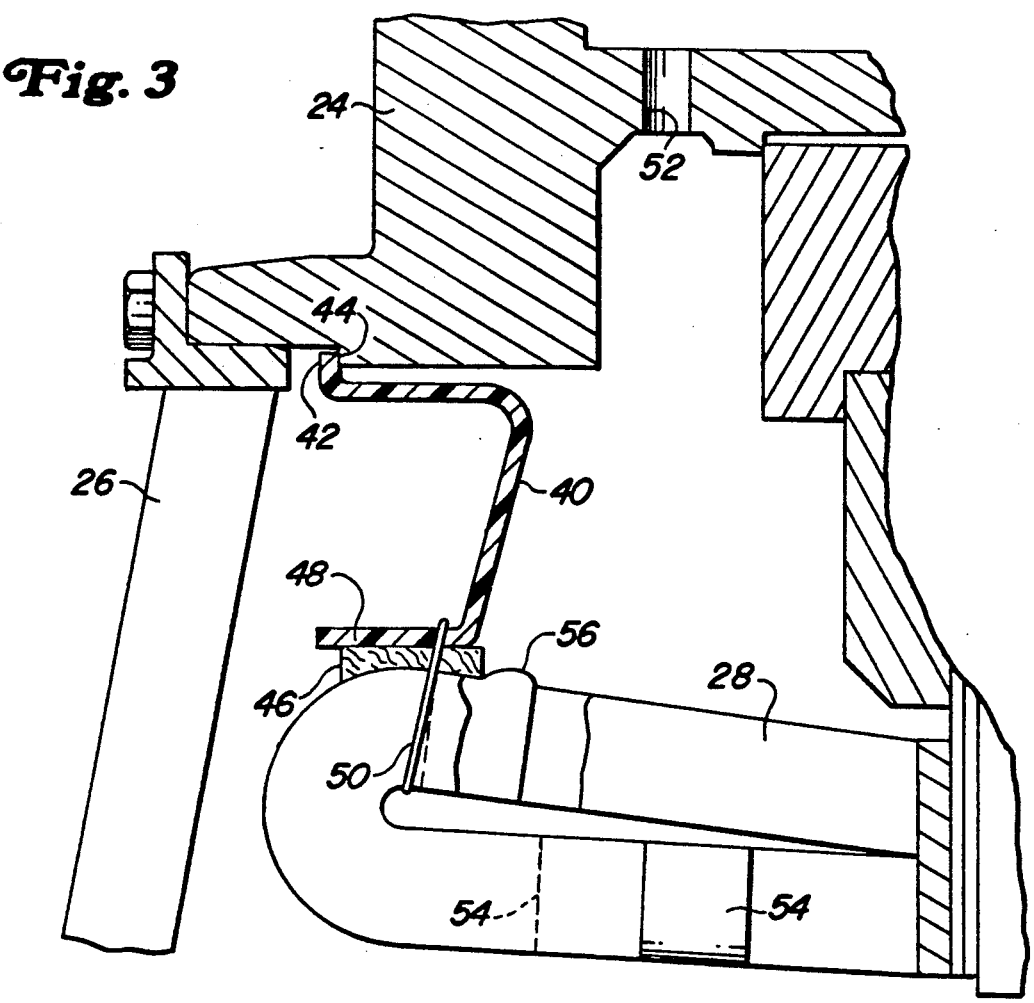
FIG. 3 is a detail of FIG. 1.
Figure 4:
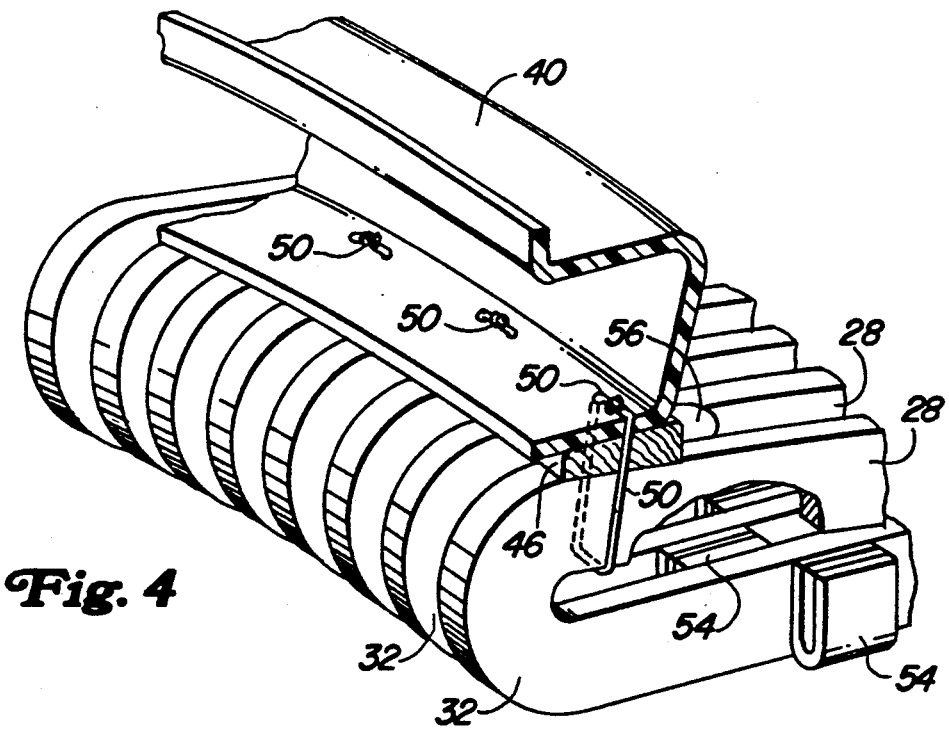
FIG. 4 is a perspective view of a portion of the air baffle and stator of the machine of FIG. 1, unwrapped into a nearly straight for clarity of illustration.

As best seen in FIGS. 3 and 4, the air baffle 40 preferably is an annular fiberglass composite structure, with a substantially U-shaped cross-section for strength and flexibility. Fiberglass is well suited for this purpose, since it is stiff, can withstand significant heat build-up and is easily formed into a suitable shape.

The radially outer edge 42 of the air baffle 40 is flared out so it is substantially in a radial plane. This outer edge then is loosely held in an annular gap between the rotor supports 26 and a shoulder 44 formed in the stator frame 24. With this mounting, the air baffle 40 can move back and forth in and rotate around the annular gap, so it is both free to rotate and to move longitudinally to a limited degree.

A felt pad 46 is positioned between the radially inner side 48 of the air baffle 40 and the coils 28. Glass ties 50 extend through holes in the inner side 48 of the air baffle 40 and the felt pad 46 to tie around the coil end portions 32. The ties 50 can be used with every coil 28, or with just a selected number of coils 28 (as shown in FIG. 4). As will be apparent, with this structure the air baffle 40 serves to hold the coils 28 in position relative to one another, so that the prior art tie ring 16 may be eliminated.

After the coils 28, air baffle 40, felt pad 46 and glass ties 50 are completely assembled into the motor, they preferably are coated with varnish (which for clarity has not been shown in the drawings) to protect them, stiffen them and further bind them together. In some applications, it may be necessary to provide one or more drain holes 52 for excess varnish to drain out, since the air baffle 40 prevents the varnish from flowing out through the end of the machine. However, the prior art chamfer 19 can be eliminated, so a stator frame according to the present invention is less costly to make than a stator frame according to the prior art.

According to a further aspect of the invention, felt spacers 54 are placed between the end portions 32 of the coils to help maintain them in position. These spacers 54 are placed in a staggered or serpentine arrangement (best seen in FIG. 4) so that at most one side of any part of the coil end portions 32 is covered by felt (and therefore insulated from the cooling air flow).

In a further preferred embodiment, additional spacers 56 are placed between the coil end portions 32 and pressed against the felt pad 46. Frictional engagement between these spacers 56 and the felt pad 46 will help hold the coil end portions 32 in position. When varnish is applied, it will soak through both felt pads and further strengthen the connection.

In operation, air is forced to flow through the gap between the stator and the rotor and through any other available openings in the stator, e.g., between the coils 28 or through the air passages 34. The air can be driven by any suitable means, e.g., due to motion of a vehicle in which the motor is mounted, due to a fan mounted to the motor rotor, or due to a fan elsewhere with air then ducted to the motor.

A small amount of the air may still be able to flow past rather than through the end portions 32 of the coils, as shown in FIG. 1 by the arrow B. However, the bulk of the air will be forced by the air baffle 40 to flow through the end portions 32 of the coils, as shown by the arrows C, thereby enhancing coil cooling.

Tests of the invention have been run using a machine of the type used on a diesel-electric locomotive equipped with a prototype of the air baffle described herein. Adding the air baffle resulted in a temperature decrease of 29° C. for the stator coils, and lowered hot spot temperatures in the felt spacers between the coils by 50° C., even though air flow through the machine was reduced from the usual 9000 standard cubic feet per minute (SCFM) to 8500 SCFM. Adequate cooling was provided even upon further reduction in air flow to 7650 SCFM because of the improved cooling efficiency resulting from use of the air baffle.

While the invention has been described in conjunction with specific embodiments, it is to be understood that many alternatives, modifications and variations will be apparent to those skilled in the art in light of the foregoing description. For example, brackets or some similar structure could be used to loosely hold the outer edge of the air baffle in place, instead of the shoulder 44 and rotor support 26 described. Similarly, the air baffle could have a variety of ways. Specifically, the "U" shaped cross section and fiberglass material of the air baffle are not the only geometry and for material that could perform the described functions. Nor is it necessary that the baffle be of one piece construction as a segmented multi piece design could also work. In fact, the initial test prototype was such a segmented design. Rather than being arranged in a completely non-overlapping fashion, the felt spacers 54 could slightly overlap without unduly hindering the cooling effects (though maximum cooling would be attained with no such overlap). Accordingly, this invention is intended to embrace all such alternatives, modifications and variations which fall within the spirit and scope of the appended claims.

I claim:

1. An dynamoelectric machine comprising:
    a stator having a plurality of stator coils and at least one air passage extending longitudinally through the stator;
    a stator frame having an inlet and an outlet end surrounding the stator;
    a rotor rotatably mounted inside the stator;
    air baffle means, adjacent to the stator at the outlet end and extending between and sealingly engaging the stator frame and ends of the coils, for directing any air flowing from at least one air passage through the coil ends.

2. The dynamoelectric machine of claim 1, wherein the air baffle means comprises: an annular air baffle having a substantially U-shaped cross-section.

3. The dynamoelectric machine of claim 2, wherein the air baffle is comprised of a fiberglass composite.

4. The dynamoelectric machine of claim 1, further comprising:
    a plurality of rotor supports mounted to the stator frame for rotatably supporting the rotor, and wherein an annular shoulder is formed in the stator frame, a radially outer portion of the air baffle means being loosely held in a gap between the shoulder and the rotor supports.

5. The dynamoelectric machine of claim 1, further comprising:
a pad mounted between the air baffle means and the coils.

6. The dynamoelectric machine of claim 5, further comprising:
a plurality of spacers between the coils and abutting against the pad.

7. The dynamoelectric machine of claim 6, wherein the pad and the spacers are comprised of felt.

8. The electric motor of claim 5, further comprising:
a plurality of glass ties extending through a radially inner portion of the air baffle means, through the pad and around the coils to hold the air baffle means, pad and coils together.

9. The dynamoelectric machine of claim 6, further comprising:
a varnish coating on the air baffle means, pad, glass ties and coils.

10. The dynamoelectric machine of claim 9, wherein a drain hole is formed in the stator frame to allow excess varnish to drain out of the motor when the varnish coating is applied.

11. The dynamoelectric machine of claim 1, further comprising:
a plurality of spacers between the coils, the spacers being arranged in a serpentine fashion so that the spacer on one side of a coil is substantially out of alignment with the spacer on the opposite side of the coil.

12. A dynamoelectric machine comprising:
a substantially annular stator having a plurality of stator coils circumferentially spaced thereabout and a stator body in which the stator coils are embedded, ends of the stator coils extending out of the stator body and the stator body having at least one air passage extending therethrough;
a stator frame supporting and surrounding the stator and having an annular shoulder formed therein;
a rotor rotatably mounted inside the stator;
a plurality of rotor supports for rotatably supporting the rotor;
an annular air baffle having a substantially U-shaped cross-section mounted adjacent to an end of the stator with a radially outer edge of the air baffle being loosely held between the annular shoulder and the rotor supports;
a felt pad between the air baffle and the coils; and
a plurality of glass ties extending through an inner side of the air baffle, through the felt pad and around the coils to hold the air baffle, felt pad and coils together.

13. The dynamoelectric machine of claim 12, further comprising a plurality of felt spacers between the coils and abutting against the felt pad.

14. The dynamoelectric machine of claim 12, further comprising a plurality of felt spacers between the coils, the spacers being arranged in a serpentine fashion so that the spacer on one side of a coil is substantially out of alignment with the spacer on the opposite side of the coil.

15. The dynamoelectric machine of claim 12, further comprising a varnish coating on the air baffle, felt pad, glass ties and coils.

16. The dynamoelectric machine of claim 15, wherein a drain hole is formed in the stator frame to allow excess varnish to drain out of the motor when the varnish coating is applied.

17. A dynamoelectric machine comprising:
a stator having a plurality of stator coils and at least one air passage extending longitudinally through the stator;
a stator frame surrounding the stator;
a rotor rotatably mounted inside the stator;
air baffle means, adjacent to the stator and extending between and sealingly engaging the stator frame and ends of the coils, for directing any air flowing from the at least one air passage through the coil ends;
pad means operatively position between the air baffle means and the coil; and
means, extending through an inner side of the baffle means, through the end means and around the coils, for holding the baffle means, pad means and coils together.

18. The machine of claim 17 wherein the holding means comprises glass ties.

19. A dynamoelectric machine comprising:
a stator having a plurality of coils and at least one air passage extending therethrough;
a stator frame surrounding the stator;
a rotor rotatably mounted inside the stator; and
flexible air baffle means, operatively positioned in sealingly engagement with the stator frame and the ends of the coils, for accommodating the lobe, and the high current distortion of the ends of the stator coils.

20. The machine of claim 19 wherein the flexible air baffle means floats in a gap between an annular shoulder formed in the stator frame and a plurality of rotor supports mounted to the stator frame.

* * * * *